(12) United States Patent
Kasahara et al.

(10) Patent No.: US 8,658,746 B2
(45) Date of Patent: Feb. 25, 2014

(54) ELECTROLYTE POLYMER FOR POLYMER ELECTROLYTE FUEL CELLS, PROCESS FOR ITS PRODUCTION AND MEMBRANE-ELECTRODE ASSEMBLY

(75) Inventors: Nobuyuki Kasahara, Yokohama (JP); Atsushi Watakabe, Yokohama (JP); Tetsuji Shimohira, Yokohama (JP); Hisao Kawazoe, Yokohama (JP); Ichiro Terada, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 690 days.

(21) Appl. No.: 12/976,446

(22) Filed: Dec. 22, 2010

(65) Prior Publication Data

US 2011/0091791 A1 Apr. 21, 2011

Related U.S. Application Data

(60) Division of application No. 12/329,119, filed on Dec. 5, 2008, now Pat. No. 7,902,311, which is a division of application No. 11/271,915, filed on Nov. 14, 2005, now Pat. No. 7,488,788, which is a continuation of application No. PCT/JP2004/006689, filed on May 12, 2004.

(30) Foreign Application Priority Data

May 13, 2003 (JP) .................................. 2003-133991

(51) Int. Cl.
   *C08F 16/24* (2006.01)
(52) U.S. Cl.
   USPC ............. 526/247; 429/41; 429/314; 526/243; 526/287
(58) Field of Classification Search
   USPC ............. 526/247, 243; 626/287; 429/41, 314
   See application file for complete search history.

(56) References Cited

U.S. PATENT DOCUMENTS

| | | | | |
|---|---|---|---|---|
| 3,041,317 A | * | 6/1962 | Gibbs et al. | 526/243 |
| 4,266,036 A | * | 5/1981 | Baczek et al. | 521/26 |
| 4,358,545 A | * | 11/1982 | Ezzell et al. | 521/27 |
| 4,940,525 A | * | 7/1990 | Ezzell et al. | 204/252 |
| 5,468,574 A | * | 11/1995 | Ehrenberg et al. | 429/493 |
| 6,080,501 A | * | 6/2000 | Kelley et al. | 429/421 |
| 6,248,469 B1 | * | 6/2001 | Formato et al. | 429/494 |
| 7,435,495 B2 | * | 10/2008 | DeSimone et al. | 429/442 |
| 2002/0160272 A1 | | 10/2002 | Tanaka et al. | |
| 2009/0023038 A1 | * | 1/2009 | DeSimone et al. | 429/33 |

FOREIGN PATENT DOCUMENTS

| | | |
|---|---|---|
| EP | 1 139 472 A1 | 10/2001 |
| EP | 1 596 453 A1 | 11/2005 |
| JP | 11-116710 | 4/1999 |
| JP | 2003-321558 | 11/2003 |
| JP | 2004-18673 | 1/2004 |
| JP | 2004-0186673 A * | 1/2004 |
| WO | WO 2004/102714 | 11/2004 |
| WO | WO-2004/102714 A1 * | 11/2004 |

OTHER PUBLICATIONS

R. Baldwin, "Hydrogen-Oxygen Protein-Exchange Membrane Fuel Cells and Electrolyzers", Journal of Power Sources, vol. 29, 1990, pp. 399-412.*

Extended European Search Report issued Nov. 4, 2010, in Application No. 10009726.0-2119.

* cited by examiner

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

To provide an electrolyte polymer for polymer electrolyte fuel cells, made of a perfluorinated polymer having sulfonic groups, characterized in that in a test of immersing 0.1 g of the polymer in 50 g of a fenton reagent solution containing 3% of an aqueous hydrogen peroxide solution and 200 ppm of bivalent iron ions at 40° C. for 16 hours, the amount of eluted fluorine ions detected in the solution is not more than 0.002% of the total amount of fluorine in the polymer immersed. The electrolyte polymer of the present invention has very few unstable terminal groups and has an excellent durability, and therefore, is suitable as a polymer constituting an electrolyte membrane for polymer electrolyte fuel cells and a polymer contained in a catalyst layer.

3 Claims, No Drawings

ELECTROLYTE POLYMER FOR POLYMER ELECTROLYTE FUEL CELLS, PROCESS FOR ITS PRODUCTION AND MEMBRANE-ELECTRODE ASSEMBLY

This application is a Divisional of U.S. application Ser. No. 12/329,119, filed on Dec. 5, 2008, which is a Divisional Application of U.S. application Ser. No. 11/271,915, filed on Nov. 14, 2005, which is a Continuation of PCT/JP04/06689, filed on May 12, 2004.

TECHNICAL FIELD

The present invention relates to an electrolyte polymer for polymer electrolyte fuel cells and a membrane-electrode assembly for polymer electrolyte fuel cells.

BACKGROUND ART

Attention has been drawn to a hydrogen-oxygen fuel cell as a power generating system which presents substantially no adverse effects on the global environment because in principle, its reaction product is water only. Polymer electrolyte fuel cells were once mounted on spaceships in the Gemini project and the Biosatellite project, but their power densities at the time were low. Later, more efficient alkaline fuel cells were developed and have dominated the fuel cell applications in space including space shuttles in current use.

Meanwhile, with the recent technological progress, attention has been drawn to polymer fuel cells again for the following two reasons: (1) Highly ion-conductive membranes have been developed as polymer electrolytes and (2) it has been made possible to impart extremely high activity to the catalysts for use in gas diffusion electrodes by using carbon as the support and incorporating an ion exchange resin in the gas diffusion electrodes so as to be coated with the ion exchange resin.

However, a perfluorinated polymer having sulfonic groups to be used as a polymer contained in a membrane and an electrode usually has unstable functional groups such as —COOH groups, —CF=$CF_2$ groups, —COF groups and —$CF_2$H groups at some molecular chain terminals, and therefore, there was such a problem that a polymer gradually decomposes during long-term fuel cell operations, followed by decreasing the power generation voltage. In addition, there was such a problem that the fuel cell operation cannot be conducted because decrease of the mechanical strength due to the polymer decomposition, locally causes pinholes, breaking, abrasion or the like.

The above problems are caused by the presence of such unstable functional groups at some molecular chain terminals of a fluorine-containing polymer, and as methods for stabilizing such molecular chain terminals, for example, the following methods have been proposed.

A method of hydrothermal treatment of a tetrafluoroethylene/hexafluoropropylene copolymer (hereinafter referred to as a TFE/HFP copolymer) at a high temperature to convert —COOH groups to —$CF_2$H groups (U.S. Pat. No. 3,085,083).

A method of decarboxination and fluorination of a fluorine-containing polyether having a low molecular weight by using fluorine gas in a liquid state or a state as dissolved in an inert solvent, to stabilize terminal groups (U.S. Pat. No. 3,242,218).

A method of shearing a TFE/HFP copolymer by a twin-screw extruder at a high temperature, followed by treating with fluorine gas (U.S. Pat. No. 4,626,587).

A method of treating a tetrafluoroethylene/perfluoroalkyl vinyl ether copolymer (hereinafter referred to as a TFE/PFVE copolymer) by contacting it with fluorine gas in the form of pellets (JP-B-4-83).

A method of treating a TFE/PFVE copolymer by contacting it with fluorine gas in the form of granules (JP-B-7-30134).

A method of treating a TFE/HFP copolymer or a TFE/PFVE copolymer by contacting it with fluorine gas in the form of a pulverized product having an average particle diameter of from 5 to 500 μm (JP-B-7-5743).

A method of treating a TFE/PFVE copolymer by stirring a polymerization product obtained by solution polymerization or suspension polymerization in water, followed by contacting the resulting spherical granules having an average particle diameter of from 1 to 5 mm with fluorine gas (JP-A-10-87746).

A method of subjecting a TFE/HFP copolymer or a TFE/PFVE copolymer to reactive heat treatment with oxygen and water by a kneader (JP-A-2000-198813).

A method of carrying out treatment of a TFE/HFP copolymer or a TFE/PFVE copolymer by melt-kneading in the presence of oxygen and melt-kneading in the presence of water in a single kneader (JP-A-2002-249585).

However, such methods are not designed for treatment of a polymer having ion exchange groups or their precursor groups, but designed for stability of a fluorine-containing polymer at the time of heat forming. Here, in this specification, precursor groups for ion exchange groups mean groups convertible to ion exchange groups by e.g. hydrolysis, and precursor groups for sulfonic groups may, for example, be —$SO_2$F groups or —$SO_2$Cl groups.

As a method of improving the stability of a fluorine-containing polymer containing ion exchange groups or their precursor groups, a treating method has been proposed wherein a perfluoropolymer having sulfonic groups is put in a shaking tube coated with nickel or a stainless steel container and contacted with fluorine gas (JP-B-46-23245). However, by such a method, the treatment was not sufficient, and if a perfluoropolymer having sulfonic groups, treated by such a method, was used, there was a problem that although the voltage decrease in a fuel cell operation became small, it did not reach a level of at most 10 μV/h, and the sufficient durability could not be obtained.

Further, in such a treating method with fluorine gas, a peroxide test is described as an index for durability against polymer decomposition, wherein from 0.5 to 1.5 g of a polymer is immersed in 50 g of a fenton reagent solution containing 30% of an aqueous hydrogen peroxide solution and 10 ppm of bivalent iron ions at 85° C. for 20 hours, and the weight decrease is measured after drying. However, there was a problem that a polymer containing ion exchange groups is highly hygroscopic and cannot be measured with sufficient precision.

DISCLOSURE OF THE INVENTION

Accordingly, it is an object of the present invention to provide an electrolyte polymer for polymer electrolyte fuel cells excellent in durability, which is obtained by reducing the number of unstable functional groups present at some molecular chain terminals of a fluorine-containing polymer having sulfonic groups to be used as an electrolyte polymer contained in electrolyte membranes and catalyst layers for polymer electrolyte fuel cells.

The present invention provides an electrolyte polymer for polymer electrolyte fuel cells, made of a perfluorinated polymer having sulfonic groups, characterized in that in a test of immersing 0.1 g of the polymer in 50 g of a fenton reagent solution containing 3% of an aqueous hydrogen peroxide solution and 200 ppm of bivalent iron ions at 40° C. for 16 hours, the amount of eluted fluorine ions detected in the solution is not more than 0.002% of the total amount of fluorine in the polymer immersed.

Further, the present invention provides a process for producing an electrolyte polymer for polymer electrolyte fuel cells made of a perfluorinated polymer having sulfonic groups, characterized in that a perfluorinated polymer having precursor groups for sulfonic groups, is subjected to heat treatment for at least 0.1 hour at a temperature of from 200 to 300° C. under a reduced pressure of at most 0.02 MPa and then contacted with fluorine gas at a temperature of from 150 to 200° C. and further subjected to hydrolysis and treatment for conversion to an acid form, to convert the precursor groups to sulfonic groups.

Further, the present invention provides a membrane-electrode assembly for polymer electrolyte fuel cells, which comprises an anode and a cathode each having a catalyst layer comprising a catalyst and an electrolyte polymer, and an electrolyte membrane disposed therebetween, characterized in that at least one polymer among the polymer constituting the electrolyte membrane, the polymer contained in the anode catalyst layer and the polymer contained in the cathode catalyst layer, is made of the above electrolyte polymer.

Further, the present invention provides a method for producing a membrane-electrode assembly for polymer electrolyte fuel cells, which comprises an anode and a cathode each having a catalyst layer comprising a catalyst and an electrolyte polymer, and an electrolyte membrane disposed therebetween, characterized in that at least one polymer among the polymer constituting the electrolyte membrane, the polymer contained in the anode catalyst layer and the polymer contained in the cathode catalyst layer, is produced by the above process.

The electrolyte polymer of the present invention is a perfluorinated polymer having very few unstable terminal groups, and therefore, in a case where such a polymer is used as a membrane for fuel cells or contained in catalyst layers, the polymer decomposition due to a fuel cell operation can be suppressed. As a result, a polymer electrolyte fuel cell excellent in durability can be provided.

Further, according to the production process of the present invention, the perfluorinated polymer having sulfonic groups can be subjected to fluorination treatment efficiently and sufficiently, whereby an electrolyte polymer having very few unstable terminal groups as mentioned above can efficiently be obtained.

BEST MODE FOR CARRYING OUT THE INVENTION

In the present invention, as an index of durability against decomposition of the polymer in the fuel cell operation, an immersion test using a fenton reagent is employed. This test is carried out by immersing the polymer in an aqueous solution containing an aqueous hydrogen peroxide solution and bivalent iron ions. The concentration of the aqueous hydrogen peroxide solution is from 1 to 30%, the ion concentration of the bivalent iron ions is from 10 to 500 ppm, the immersion temperature is from 25 to 90° C., and the immersion time is from 0.5 to 24 hours. The polymer undergoes a slight weight reduction by the polymer decomposition caused by hydroxy radicals or hydroperoxy radicals which are produced in the fenton reagent. However, in the case of a polymer having ion exchanging groups, the polymer is highly hygroscopic, which makes it difficult to measure the weight precisely even when the polymer is dried. Accordingly, it is preferred from the viewpoint of sensitivity to detect fluorine ions eluted in the fenton reagent solution at the time of decomposition.

In the present invention, the test is carried out, in which 0.1 g of the electrolyte polymer is immersed in 50 g of a fenton reagent solution containing 3% of an aqueous hydrogen peroxide solution and 200 ppm of bivalent iron ions at 40° C. for 16 hours. The electrolyte polymer of the present invention is such that in the above test, the amount of eluted fluorine ions detected in the solution is not more than 0.002% of the total amount of fluorine in the polymer immersed. If it is more than 0.002%, the amount of the unstable terminal groups is large, whereby the voltage is likely to decrease during a long-term fuel cell operation.

The electrolyte polymer for polymer electrolyte fuel cells in the present invention may, for example, be a copolymer of a perfluorovinyl compound represented by the formula $CF_2=CF(OCF_2CFX)_m—O_p—(CF_2)_nSO_3H$ (wherein X is a fluorine atom or a trifluoromethyl group, m is an integer of from 0 to 3, n is an integer of from 0 to 12, and p is 0 or 1, provided that when n=0, p=0) with a perfluoroolefin, a perfluoroalkyl vinyl ether or the like. Specific examples of the above perfluorovinyl compound are compounds represented by the formulae 1 to 4. Here, in the formulae 1 to 4, q is an integer of from 1 to 9, r is an integer of from 1 to 8, s is an integer of from 0 to 8, and z is 2 or 3.

$CF_2=CFO(CF_2)_qSO_3H$                        Formula 1

$CF_2=CFOCF_2CF(CF_3)O(CF_2)_rSO_3H$           Formula 2

$CF_2=CF(CF_2)_sSO_3H$                          Formula 3

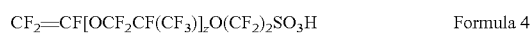

$CF_2=CF[OCF_2CF(CF_3)]_zO(CF_2)_2SO_3H$       Formula 4

The polymer comprising repeating units based on a perfluorovinyl compound having a sulfonic group is usually obtained by polymerization of a perfluorovinyl compound having a —$SO_2F$ group. The perfluorovinyl compound having the —$SO_2F$ group may be homopolymerized, but it is usually copolymerized with a comonomer such as a perfluoroolefin or a perfluoro(alkyl vinyl ether) as mentioned above because it is unlikely to undergo radical polymerization. The perfluoroolefin to be used as a comonomer, may, for example, be tetrafluoroethylene or hexafluoropropylene. Usually, it is preferred to use tetrafluoroethylene.

The perfluoro(alkyl vinyl ether) to be used as a comonomer is preferably a compound represented by $CF_2=CF—(OCF_2CFY)_t—O—R^f$. Here, in the formula, Y is a fluorine atom or a trifluoromethyl group, and t is an integer of from 0 to 3. $R^f$ is a linear or branched perfluoroalkyl group represented by $C_uF_{2u+2}$ ($1 \leq u \leq 12$).

Preferred examples of the compound represented by $CF_2=CF—(OCF_2CFY)_t—O—R^f$ may be compounds represented by the formulae 5 to 7. Here, in the formulae 5 to 7, v is an integer of from 1 to 8, w is an integer of from 1 to 8, and x is an integer of from 1 to 3.

$CF_2=CFO(CF_2)_vCF_3$                         Formula 5

$CF_2=CFOCF_2CF(CF_3)O(CF_2)_wCF_3$            Formula 6

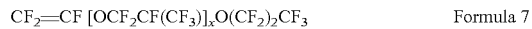

$CF_2=CF[OCF_2CF(CF_3)]_xO(CF_2)_2CF_3$        Formula 7

In addition to a perfluoroolefin or a perfluoro(alkyl vinyl ether), another perfluorinated monomer such as perfluoro(3- oxahepta-1,6-diene) may also be copolymerized with the perfluorovinyl compound having a —SO$_2$F group, as a comonomer.

In a case where the electrolyte polymer of the present invention is to be used as an electrolyte membrane for polymer electrolyte fuel cells, the concentration of the sulfonic groups in the electrolyte polymer, namely, the ion exchange capacity, is preferably from 0.5 to 2.0 meq/g dry resin, particularly preferably from 0.7 to 1.6 meq/g dry resin. If the ion exchange capacity is lower than such a range, the resistance of the electrolyte membrane obtainable tends to be large. On the other hand, if it is higher than such a range, the mechanical strength of the electrolyte membrane tends to be insufficient.

The process for producing the electrolyte polymer of the present invention is characterized in that a perfluorocarbon polymer (which may contain an oxygen atom of an ether bond type) having precursor groups for sulfonic groups, is subjected to heat treatment for at least 0.1 hour at a temperature of from 200 to 300° C. under a reduced pressure of at most 0.02 MPa and then contacted with fluorine gas at a temperature of from 150 to 200° C. Here, the precursor groups for the sulfonic groups are mainly —SO$_2$F groups. Unstable terminal groups such as —COOH groups or —CF=CF$_2$ groups present in some molecular chain terminals are firstly converted to —COF groups by heat treatment, and then converted to stable —CF$_3$ groups by contacting with fluorine gas. It is considered that the heat treatment under reduced pressure in a first step has an effect of accelerating the conversion of functional groups although it is not obvious, and the treatment of contacting it with fluorine gas in a second step can increase the ratio of conversion to the stable —CF$_3$ groups.

The heat treatment temperature under reduced pressure in the present invention is usually from 200 to 300° C., preferably from 220 to 280° C. If is lower than 200° C., conversion of the unstable functional groups tends to be insufficient, such being undesirable. On the other hand, if it is higher than 300° C., precursor groups (—SO$_2$F groups) for the ion exchange groups tend to be decomposed during such treatment, thus leading to a decrease of the ion exchange capacity of the finally obtainable electrolyte polymer. It is particularly preferably from 220 to 280° C., whereby conversion of the unstable functional groups will take place efficiently, while no decomposition of the —SO$_2$F group will take place.

The pressure in the heat treatment under reduced pressure is preferably at most 0.02 MPa, more preferably at most 0.01 MPa. If it is more than 0.02 MPa, conversion of the unstable terminal functional groups will not take place efficiently, such being undesirable. The heat treatment is preferably carried out under a pressure of at most 0.01 MPa, whereby conversion efficiency of the unstable terminal functional groups becomes remarkably high. The treatment time is usually at least 0.1 hour, preferably from 0.2 to 16 hours. If it is less than 0.1 hour, conversion of the unstable functional groups will not take place sufficiently, such being undesirable. If it is more than 16 hours, such will be disadvantageous from the viewpoint of productivity. It is preferably from 0.2 to 16 hours, whereby the conversion of the unstable functional groups will be sufficient and the productivity can also be secured.

The above heat treatment under reduced pressure may be carried out in a reduced pressure oven, but may efficiently be carried out by means of a kneader such as a twin-screw extruder. In the case of using a reduced pressure oven, such heat treatment is preferably carried out by thinly and uniformly dispersing a polymer powder to be treated, on a fluorine-containing heat-resistant sheet of e.g. a perfluoroalkoxy ether (PFA). By such heat treatment, the polymer powder will be melted and formed into a sheet. The thickness of the sheet after the heat treatment is preferably at most 5 mm, whereby subsequent fluorine gas treatment will be sufficiently carried out. The thickness is further preferably at most 2 mm, whereby sufficient fluorination treatment can be carried out in a short period of time.

In the present invention, the fluorination treatment for contact with fluorine gas is usually carried out at a temperature of from 150 to 200° C., preferably from 170 to 190° C. If it is lower than 150° C., conversion of the —COF groups to the —CF$_3$ groups will not be sufficiently carried out. If it is higher than 200° C., decomposition of the precursor groups (—SO$_2$F groups) is likely to take place and the ion exchange capacity of the finally obtainable electrolyte polymer tends to be small, such being undesirable. Fluorine gas is contacted preferably at a temperature of from 170 to 190° C., whereby no decomposition of the —SO$_2$F groups will take place and the conversion into the —CF$_3$ groups will take place efficiently and sufficiently. The reaction of fluorine gas is a drastic exothermic reaction, and from the viewpoint of safety, the fluorine gas to be used is preferably diluted with inert gas such as nitrogen, and the pressure is preferably at a level of at most 1 MPa. After the fluorination treatment, the temperature is lowered, and unreacted fluorine gas is removed.

A reactor to be used at the time of contacting the polymer with fluorine gas is preferably a pressure-resistant reactor having an inside surface made of hastelloy C alloy. The reason is not clearly understood, but when a pressure-resistant reactor having an inside surface made of hastelloy C alloy is used, the conversion efficiency of the terminal unstable functional groups into stable functional groups at the time of fluorination treatment becomes high, such being desirable.

For example, if the copolymer comprising repeating units based on tetrafluoroethylene and repeating units based on a perfluorovinyl compound having a sulfonic group, is produced without being subjected to the above heat treatment under reduced pressure and fluorination treatment in its production process, the amount of eluted fluorine ions detected in the solution in a test with a fenton reagent, is usually at least 0.05% of the total amount of fluorine in the polymer immersed. However, such an amount can be suppressed to a level of not more than 0.002% by carrying out the above heat treatment under reduced pressure and fluorination treatment.

The electrolyte polymer of the present invention can suitably be used as a polymer constituting an electrolyte membrane or an electrolyte polymer contained in an anode and a cathode for polymer electrolyte fuel cells. It is particularly preferred that the electrolyte polymer of the present invention is used as both the polymer constituting the electrolyte membrane and the electrolyte polymer contained in the anode and the cathode, from the viewpoint of durability of fuel cells. The polymer electrolyte fuel cell has a membrane-electrode assembly having a cathode and an anode disposed respectively on both sides of the electrolyte membrane, and a fuel is supplied to this membrane-electrode assembly for power generation. Such cathode and anode are usually made of a catalyst layer and a gas diffusion layer. The catalyst layer is a layer containing a catalyst and an electrolyte polymer and is disposed adjacent to the electrolyte membrane. The gas diffusion layer is a porous layer disposed adjacent to the catalyst layer, and has a role of efficiently supplying gas to the catalyst layer and a role as a current collector. Usually, a carbon cloth or the like is used for the gas diffusion layer.

Now, the present invention will be described in further detail with reference to Examples and Comparative Examples. However, it should be understood that the present invention is by no means restricted thereto.

EXAMPLE 1

2,800 g of a copolymer powder comprising repeating units based on tetrafluoroethylene and repeating units based on $CF_2=CF-OCF_2CF(CF_3)O(CF_2)_2SO_2F$ (ion exchange capacity measured as converted into an acid form: 1.1 meq/g dry resin, hereinafter referred to as copolymer A) was uniformly dispersed on a PFA sheet, followed by heat treatment in a reduced pressure oven under a pressure of 10 Pa at a temperature of 250° C. for 4 hours. The thickness of a molten sheet after the heat treatment was 2 mm. The infrared absorption spectra before and after the heat treatment under reduced pressure were compared, whereby the absorption attributable to a —COOH group at 1,780 cm$^{-1}$ and 1,810 cm$^{-1}$ and the absorption attributable to —CF=CF$_2$ at 1,800 cm$^{-1}$ were found to be decreased, and the absorption attributable to a —COF group at 1,880 cm$^{-1}$ was found to be increased by the heat treatment under reduced pressure.

On the other hand, into a pressure-resistant reactor having an inner capacity of 32 L and having an inside surface made of a hastelloy C alloy, a multistage shelf made of a hastelloy C alloy was put, and a mixed gas consisting of 20% of fluorine gas and 80% of nitrogen gas was introduced under a gage pressure of 0.25 MPa. The reaction system was maintained at 190° C. for 4 hours to carry out passivation treatment of the metal surface. After lowering the temperature, the sheet which was subjected to the above heat treatment under reduced pressure, was put on the shelf in the above 32 L pressure-resistant reactor, and a mixed gas consisting of 20% of fluorine gas and 80% of nitrogen gas was introduced under a gage pressure of 0.25 MPa. The reaction system was maintained at 180° C. for 4 hours to carry out fluorination treatment. After the treatment, fluorine gas was discharged and a polymer was taken out and pulverized by a pulverizer to obtain a fluorination-treated polymer having —SO$_2$F groups as precursor groups for sulfonic groups (hereinafter referred to as a precursor polymer).

The above fluorination-treated precursor polymer was hydrolyzed in an aqueous solution containing 20% of methanol and 10% of potassium hydroxide, and then, it was washed with sulfuric acid to be converted to an acid form and further washed with deionized water, to convert —SO$_2$F groups to sulfonic groups thereby to obtain an acid-form polymer.

The polymer obtained was maintained for 24 hours in a glove box supplied with nitrogen. Then, about 0.1 g of the polymer was weighed in the glove box and immersed in 50 g of a fenton reagent solution containing 3% of an aqueous hydrogen peroxide solution and 200 ppm of bivalent iron ions at 40° C. for 16 hours. After the polymer was removed, the mass of the solution was measured, and the fluorine ion concentration in the solution was measured by an ion meter, whereupon the amount of eluted fluorine ions was calculated and found to be 0.001% of the total amount of fluorine in the polymer immersed.

EXAMPLE 2

2,500 g of the precursor polymer obtained in Example 1 was kneaded and pelletized by a twin-screw extruder and then molded by extrusion into a sheet-form by means of a single-screw extruder to obtain a membrane having a thickness of 30 μm. The obtained membrane was hydrolyzed by immersing it in a hydrolytic solution having the same liquid composition as in Example 1, and after treatment for conversion to an acid form with sulfuric acid, was washed with water to obtain an electrolyte membrane for fuel cells.

On the other hand, 2,500 g of the acid-form polymer obtained in Example 1 was dissolved in ethanol by means of a pressure resistant autoclave having an inside surface made of hastelloy C alloy, to obtain a 10% ethanol solution of a fluorination-treated copolymer A.

Then, 126 g of distilled water was added to 20 g of a catalyst having 50% of platinum supported on a carbon black powder, and ultrasonic waves were applied for 10 minutes to disperse the catalyst uniformly. 80 g of the above 10% ethanol solution of the fluorination-treated copolymer A, was added thereto, and 54 g of ethanol was further added to bring the solid content concentration to 10%, thereby to obtain a coating liquid for preparing a cathode catalyst layer. Such a coating liquid was applied on a substrate film and dried to form a cathode catalyst layer having a platinum amount of 0.5 mg/cm$^2$.

Further, 124 g of distilled water was added to 20 g of a catalyst having 53% of a platinum/ruthenium alloy (platinum/ruthenium ratio=30/23) supported on a carbon black powder, and ultrasonic waves were applied for 10 minutes to disperse the catalyst uniformly. 75 g of the 10% ethanol solution of the above fluorination-treated electrolyte polymer, was added thereto, and 56 g of ethanol was further added to bring the solid content concentration to about 10%, thereby to obtain a coating liquid for preparing an anode catalyst layer. Such a coating liquid was applied on a substrate film and dried to form an anode catalyst layer having a platinum amount of 0.35 mg/cm$^2$.

The above fluorination-treated electrolyte membrane for fuel cells, was sandwiched between the cathode catalyst layer and the anode catalyst layer, and pressed by hot press to bond both catalyst layers to the membrane. Then, the substrate films were peeled off to obtain a membrane-catalyst layer assembly having an electrode area of 25 cm$^2$. The pressing conditions were adjusted at a temperature of 120° C., for 2 minutes and under a pressure of 3 MPa. Such an assembly was interposed between two sheets of gas diffusion layers made of carbon cloth having a thickness of 350 μm to prepare a membrane-electrode assembly. This membrane-electrode assembly is mounted in a cell for power generation, and a mixed gas (utilization: 70%) consisting of 80% of hydrogen and 20% of carbon dioxide is supplied to the anode and air (utilization: 40%) was supplied to the cathode, respectively at normal pressure. Durability of the polymer electrolyte fuel cell at a cell temperature of 70° C. and a current density of 0.2 A/cm$^2$ is evaluated, and the cell voltage becomes 750 mV and the rate of voltage reduction becomes about 2 μV/h after 1,000 hours from the beginning of the operation. Here, the gas to be supplied to each of the anode and cathode is supplied to the cell as a gas moisturized to have a dew point of 70° C.

EXAMPLE 3

The 10% ethanol solution of the electrolyte polymer obtained in Example 2, was cast on a substrate and then dried to obtain a cast membrane having a thickness of 30 μm. The obtained membrane was subjected to heat treatment at 120° C. for 0.5 hour to obtain a membrane for fuel cells. A membrane-electrode assembly was prepared in the same manner as in Example 2 except that this membrane was used, and its power generation properties were measured. As a result, the cell voltage was 730 mV and the rate of voltage reduction was about 2 μV/h, after 1,000 hours from the beginning of the operation.

EXAMPLE 4 (COMPARATIVE EXAMPLE)

Using a copolymer A not subjected to heat treatment or fluorination treatment, a test of immersing it in a fenton reagent was carried out in the same manner as in Example 1. After such a test, the fluorine ion concentration in the solution was measured by an ion meter, whereupon the amount of eluted fluorine ions was calculated and found to be 0.063% of the total amount of fluorine in the polymer immersed.

EXAMPLE 5 (COMPARATIVE EXAMPLE)

Using a copolymer A which was subjected only to heat treatment in Example 1 without being subjected to fluorination treatment, a test of immersing it in a fenton reagent was carried out in the same manner as in Example 1. After such a test, the fluorine ion concentration in the solution was measured by an ion meter, whereupon the amount of eluted fluorine ions was calculated and found to be 0.050% of the total amount of fluorine in the polymer immersed.

EXAMPLE 6 (COMPARATIVE EXAMPLE)

A membrane-electrode assembly was prepared and its power generation properties were measured in the same manner as in Example 2 except that the polymer obtained in Example 5 was used. As a result, the cell voltage was 695 mV and the rate of voltage reduction was about 80 μV/h, after 1,000 hours from the beginning of the operation.

EXAMPLE 7 (COMPARATIVE EXAMPLE)

A copolymer A is subjected to fluorination treatment, and a test of immersing it in a fenton reagent is carried out in the same manner as in Example 1, except that heat treatment is carried out under normal pressure. Measurement is carried out in the same manner as in Example 5, whereupon the amount of eluted fluorine ions in the solution after such a test is calculated and found to be 0.005% of the total amount of fluorine in the polymer immersed.

EXAMPLE 8 (COMPARATIVE EXAMPLE)

A membrane-electrode assembly is prepared and its power generation properties are measured in the same manner as in Example 2 except that the polymer obtainable in Example 7 is used. The cell voltage becomes 725 mV and the rate of voltage reduction becomes about 20 μV/h, after 1,000 hours from the beginning of the operation.

Industrial Applicability

The electrolyte polymer of the present invention has very few unstable terminal groups. Therefore, a polymer electrolyte fuel cell provided with a membrane-electrode assembly having an electrolyte membrane comprising the electrolyte polymer of the present invention or a membrane-electrode assembly having a catalyst layer containing the electrolyte polymer of the present invention, is excellent in the durability, as the decomposition of the polymer due to fuel cell operation can be suppressed. Such a membrane-electrode assembly can suitably be used not only for hydrogen-oxygen fuel cells, but also for direct methanol type fuel cells or the like.

Further, according to the production process of the present invention, a perfluorinated polymer having sulfonic groups can be subjected to fluorination treatment efficiently and sufficiently, whereby the above electrolyte polymer having very few unstable terminal groups can be efficiently obtained.

The entire disclosure of Japanese Patent Application No. 2003-133991 filed on May 13, 2003 including specification, claims and summary is incorporated herein by reference in its entirety.

What is claimed is:

1. A membrane-electrode assembly for polymer electrolyte fuel cells, which comprises an anode and a cathode each having a catalyst layer comprising a catalyst and an electrolyte polymer, and an electrolyte membrane disposed therebetween, characterized in that at least one polymer among the polymer constituting the electrolyte membrane, the polymer contained in the anode catalyst layer and the polymer contained in the cathode catalyst layer, is made of an electrolyte polymer as, wherein the electrolyte polymer is made of a perfluorinated polymer having sulfonic groups, characterized in that in a test of immersing 0.1 g of the polymer in 50 g of a fenton reagent solution containing 3% of an aqueous hydrogen peroxide solution and 200 ppm of bivalent iron ions at 40.degree. C. for 16 hours, the amount of eluted fluorine ions detected in the solution is not more than 0.002% of the total amount of fluorine in the polymer immersed.

2. The membrane-electrode assembly for polymer electrolyte fuel cells according to claim 1, wherein the perfluorinated polymer is a perfluorocarbon polymer wherein the basic skeleton comprises repeating units based on $CF_2\!=\!CF_2$ and repeating units based on $CF_2\!=\!CF(OCF_2CFX)_m\!-\!O_p\!-\!(CF_2)_n SO_3H$ (wherein X is a fluorine atom or a trifluoromethyl group, m is an integer of from o to 3, n is an integer of from 0 to 12, and p is 0 or 1, provided that when n=O, p=O).

3. The membrane-electrode assembly for polymer electrolyte fuel cells according to claim 1, wherein the 5 perfluorinated polymer has an ion exchange capacity of from 0.5 to 2.0 meq/g dry resin.

* * * * *